F. B. ANDERSON.
OIL FILTER.
APPLICATION FILED MAY 6, 1908.
915,650.
Patented Mar. 16, 1909.
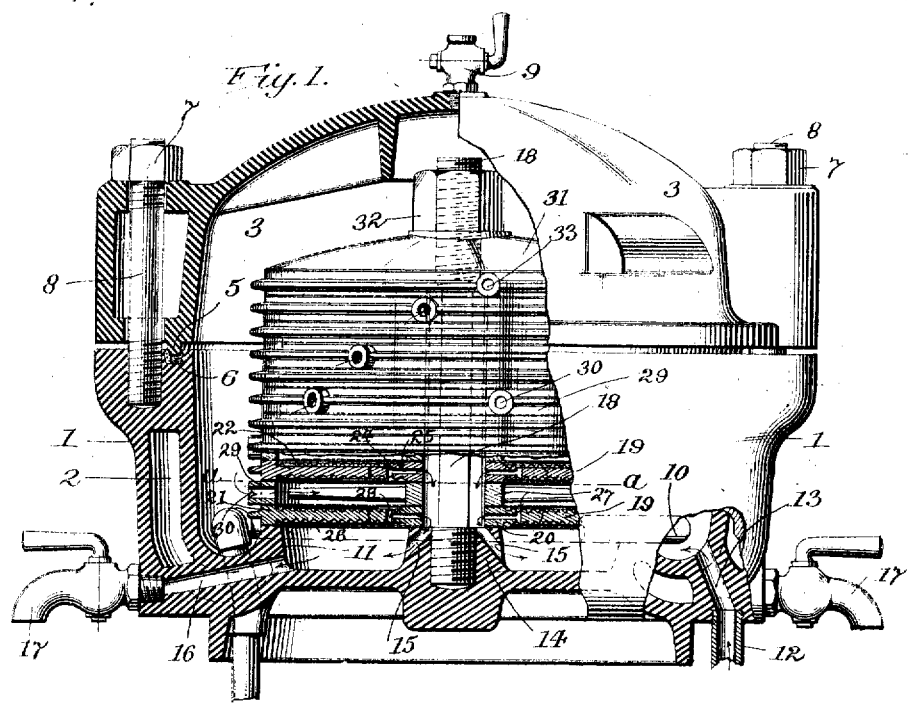
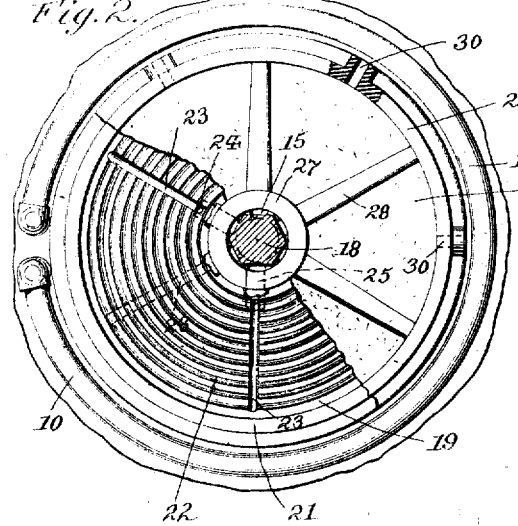
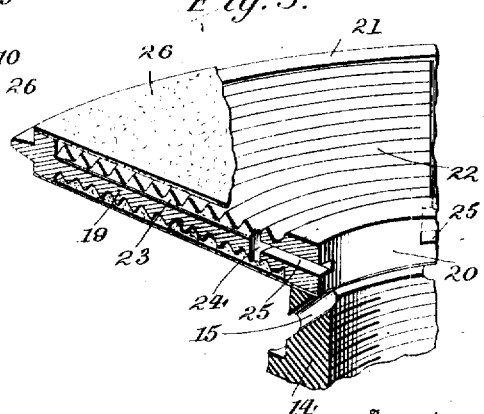
Witnesses
Inventor:
Frank B. Anderson,
By Dodge and Sons,
Attorneys

UNITED STATES PATENT OFFICE.

FRANK B. ANDERSON, OF CLEVELAND, OHIO.

OIL-FILTER.

No. 915,650.        Specification of Letters Patent.        Patented March 16, 1909.

Application filed May 6, 1908. Serial No. 431,170.

*To all whom it may concern:*

Be it known that I, FRANK B. ANDERSON, a citizen of the United States, residing at Cleveland, in the county of Cuyahoga and State of Ohio, have invented certain new and useful Improvements in Oil-Filters, of which the following is a specification.

My present invention pertains to an improved oil-filter, the construction and advantages of which will be hereinafter set forth, reference being had to the annexed drawings, wherein:

Figure 1 is a sectional elevation of the filter; Fig. 2 a horizontal sectional view, taken on the line *a—a* of Fig. 1, the outer casing being omitted; and Fig. 3 a sectional perspective view of one of the filter-plates and a portion of the hub which extends upwardly from the base of the filter.

The object of the present invention is to provide a simple filter adapted to remove impurities from lubricating oils.

The construction is such that the filter may be cheaply manufactured and installed in factories and the like where quantities of lubricating oil are employed, the used oil being passed through the filter in order to remove the impurities therefrom so that it may be used over and over again.

With a filter constructed as hereinafter set forth an engineer may readily filter the oil which is used around the plant and renew the filtering mediums or filter-papers from time to time as required.

In the drawings, 1 denotes the lower portion of the shell or casing of the filter, preferably provided with a chamber 2 which forms a jacket into which a heating medium may be introduced if so desired.

The upper portion of the shell or casing is designated by 3. A tight joint is effected between the upper and lower portions of the casing by a rib 5 formed upon the upper portion, which rib coacts with a packing 6 located in the upper face of the lower section 1. The parts are held together by nuts 7, which are screwed down upon threaded stems 8. A vent-cock 9 is located in the upper portion of the upper member 3.

A heating coil 10 will be located in the lower portion of the member 1, preferably between the inner wall thereof and a circular rim or collar 11, which extends upwardly from the base. Steam or other heating medium will be introduced into the coil and the oil, which enters the shell or casing through a pipe 12 and an opening 13, will be heated by the coil; or, in case a coil is not employed, by the heating medium introduced into the chamber 2. When a coil is employed, as will preferably be done, said chamber prevents, to a greater or less extent, radiation of the heat from the oil, which is warmed or heated by the coil. It is essential in filtering heavy machine oils that the oil be heated in order that it may be passed readily through the filtering papers which are used.

Extending upwardly from the lower portion 1 is a centrally-disposed lug or projection 14, provided with a centrally-disposed opening and with lateral passages or openings 15, said openings forming passages for the oil which flows from the filter-plates and is then discharged through passages 16 and faucets 17. A single passage and faucet may, of course, be employed. Screwed into the central opening formed in the lug 14 is a rod 18, which is polygonal in cross-section and threaded at its upper end.

The upper face of the collar or rim 11 and the upper face of the lug 14 lie in the same horizontal plane and form the support for the lowermost filter-plate 19. The various filter-plates are alike in form and their construction will be best understood upon reference to Fig. 3. Each plate is provided with a centrally-disposed hub 20, and with a peripheral, continuous, ring-shaped member 21. Both sides of the plate are formed with a series of concentric grooves or channels 22, and cross-grooves 23 (Fig. 2) connect the various grooves and permit the oil to flow from the grooves toward and into openings 24 which extend through the plates in line with the inner portions of the cross-grooves. Openings or passages 25 extend through the hub, one of said passages connecting with each of the vertically-disposed openings 24.

The filter-papers are designated by 26, and prior to the placing of the lowermost plate in position, a filter-paper is positioned upon the upper face of the rim 11 and the lug or projection 14. The plates are spaced apart by wheel-shaped members, comprising hubs 27, spokes 28, and outer ring-shaped members 29. At intervals throughout the members 29 are formed a series of openings 30, which permit the oil to pass from the chamber into the spaces formed by the spacing members between the underlying and superposed filter plates and the interposed filter-papers 26. A series of these filter-plates and spacing wheels or members is laid up in order around the rod 18, and when the requisite number have been positioned a cap-piece or cover 31 is placed over the uppermost wheel-shaped member or filter-plate, as the case may be, and forced downwardly thereon, so as to produce a tight joint between the various filter-plates and the wheel-shaped members, by means of a nut 32 which is screwed upon the upper threaded end of the rod 18. Openings 33 will be provided in the cover for the entrance of oil to the uppermost filter-paper.

The operation of the apparatus is as follows: Oil being introduced under pressure through the pipe 12 and opening 13, is heated by coming into immediate and direct contact with the coil 10 or the heated walls of the shell or casing, and passes in through the openings formed in the spacing members and in the cover-plate. It then comes in direct contact with the filter-papers, through which it is forced, and finally, passing through the grooves 22 and 23, finds its way into the openings 24 and passages 25, thence through the openings 15 to the passages 16, from which it may be withdrawn by the faucets 17. As will be noted upon reference to Fig. 2, the polygonal shape of the stem or rod 18 affords passages for the oil around the same, so that the oil coming from the uppermost filter-plate will pass down along the sides of the rod to the lateral openings 15 formed in the centrally-disposed lug or projection 14. In case the filter-papers should break or when they become clogged, the operator has merely to remove the nuts 7, lift off the upper portion 3 of the casing and remove the nut 32. The cover and the various filter-plates and spacing wheels may then be removed and the filter-papers renewed. When the parts are again positioned the vent-cock 9 is opened and the oil is forced inwardly through the pipe 12 until the air has been wholly expelled from the apparatus, after which the cock 9 is closed and the operation above set forth again takes place. It is conceivable that the flow of the oil through the apparatus might be reversed, but inasmuch as such reversal would tend to distend the filter-papers it is not thought to be good practice to so operate the filter.

Having thus described my invention, what I claim is:

1. In an oil filter, the combination of a shell or casing; means for heating the oil passing into said casing; a series of filter-plates said plates being of such form as to sustain the filter-papers in a flat condition; filter-papers mounted upon said plates; and means for holding the papers and plates in position to permit the passage of the heated oil through said papers.

2. In an oil filter, the combination of a jacketed shell or casing; means for introducing oil into the same; a series of filter-plates mounted within the shell or casing said plates being of such form as to sustain the filter-papers in a flat condition; filtering papers mounted upon said plates; and means for holding the filtering papers and plates in position.

3. In an oil filter, the combination of a shell or casing; a series of filter-plates said plates being of such form as to sustain the filter-papers in a flat condition; a series of spacing wheels located between said plates, said wheels having openings in their peripheries whereby the oil may be introduced therethrough; and filter-papers mounted upon the plates and held between said plates and the wheels.

4. In an oil filter, the combination of a shell or casing; a plurality of filter-plates; filter-papers resting upon the opposite sides of said plates; and a series of spacing wheels interposed between said filter-plates, each of said wheels comprising a central hollow hub, spokes radiating therefrom, and an outer ring-shaped member, said member being provided with openings through which the oil may pass from the shell or casing into and between each pair of oppositely-disposed filter-papers, the hub and ring-shaped member of each spacing-wheel being of substantially the same thickness, whereby the filter-papers will be held flat throughout.

5. In an oil filter, the combination of a shell or casing; means for introducing oil into the same under pressure; a series of filter-plates, each plate having a central hub and a ring-shaped peripheral member, the hub being provided with a drainage opening therethrough communicating with a similar opening extending to the drainage surface of said filter-plate; spacing-wheels located between each pair of filter-papers and their supporting plates, each of said wheels comprising a central solid hub, spokes radiating therefrom, and a ring-shaped peripheral member having openings therein for the passage of oil therethrough the hub and peripheral member of each wheel being of substantially the same thickness; and means for clamping the spacing members and the filter-plates and filter-papers in position.

In testimony whereof I have signed my name to this specification in the presence of two subscribing witnesses.

FRANK B. ANDERSON.

Witnesses:
RALPH BLUE,
L. L. STEUCK.